United States Patent [19]
Nakatani et al.

[11] Patent Number: 5,731,778
[45] Date of Patent: Mar. 24, 1998

[54] FM-CW RADAR APPARATUS FOR MEASURING RELATIVE SPEED OF AND DISTANCE TO AN OBJECT

[75] Inventors: Hiroto Nakatani; Hiroshi Hazumi, both of Nagoya; Hiroshi Mizuno, Kariya; Akihisa Fujita, Aichi-ken; Hiroshi Naganawa, Kagamigahara, all of Japan

[73] Assignee: Denso Corporation, Kariya, Japan

[21] Appl. No.: 759,129

[22] Filed: Dec. 2, 1996

[30] Foreign Application Priority Data

Dec. 1, 1995 [JP] Japan ................... 7-314305

[51] Int. Cl.$^6$ .................. G01S 13/60; G01S 13/93
[52] U.S. Cl. .................. 342/70; 342/109; 342/111; 342/115; 342/196
[58] Field of Search .................. 342/70, 71, 72, 342/106, 109, 111, 115, 114, 196

[56] References Cited

U.S. PATENT DOCUMENTS

| | | | |
|---|---|---|---|
| 4,118,701 | 10/1978 | Fletcher et al. | 342/200 |
| 4,268,828 | 5/1981 | Cribbs et al. | 342/26 |
| 4,618,863 | 10/1986 | Collins | 342/194 |
| 4,620,192 | 10/1986 | Bryant et al. | 342/128 |
| 4,825,214 | 4/1989 | Dejaegher | 342/128 |
| 5,268,692 | 12/1993 | Grosch et al. | 342/70 |
| 5,619,208 | 4/1997 | Tamatsu et al. | 342/70 |

FOREIGN PATENT DOCUMENTS

| | | |
|---|---|---|
| 0660135 | 6/1995 | European Pat. Off. |
| 4-343084 | 11/1992 | Japan |
| 5-040168 | 2/1993 | Japan |
| 5-142337 | 6/1993 | Japan |
| 5-150035 | 6/1993 | Japan |
| 6-082551 | 3/1994 | Japan |
| 7-063843 | 3/1995 | Japan |
| 2283631 | 5/1995 | United Kingdom |

OTHER PUBLICATIONS

Ingenieurs de L'Automobie; "Discrimination Spectrale et Suivi de Cibles Pour un radar FMCW Automobile"; Conferences Transport Routier; Nov. 1995; No. 701, pp. 67–72.

*Primary Examiner*—John B. Sotomayor
*Attorney, Agent, or Firm*—Cushman, Darby & Cushman IP Group of Pillsbury, Madison & Sutro LLP

[57] ABSTRACT

An FM-CW radar which is suitable for automotive anti-collision systems, for example, is provided. This radar outputs a radar signal in the form of a triangular wave whose frequency is increased at a given rate and decreased at a given rate. A receiver receives a wave reflected from a target to produce a beat signal and takes the Fourier transform of the beat signal to determine peak frequency components thereof showing peaks in a frequency spectrum. The receiver also determines phases of the peak frequency components and selects at least one from the peak frequency components in a frequency-rising range wherein the frequency of the radar signal is increased and at least one from the peak frequency components in a frequency-falling range wherein the frequency of the radar signal is decreased which show substantially the same phase to pair them for determining the distance to and relative speed of the target based on the frequency of the paired peak frequency components.

8 Claims, 12 Drawing Sheets

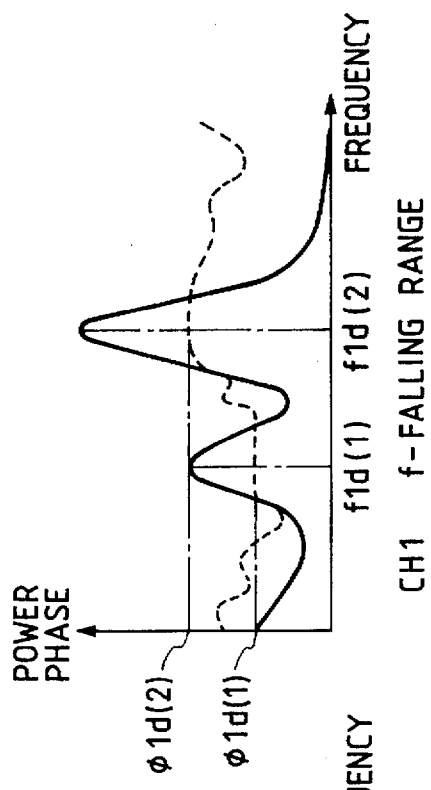
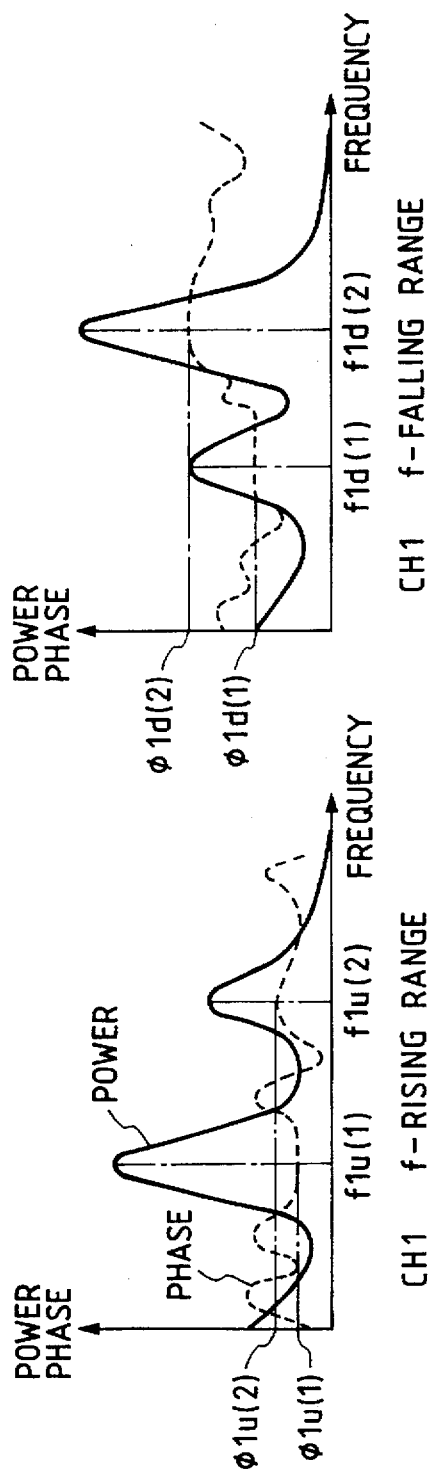
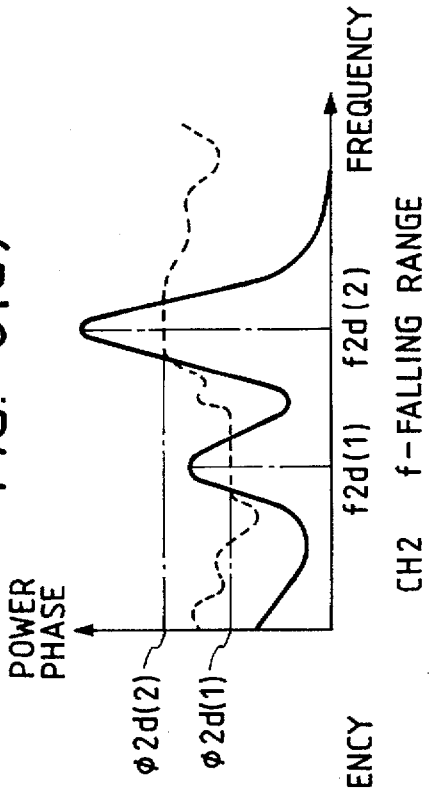
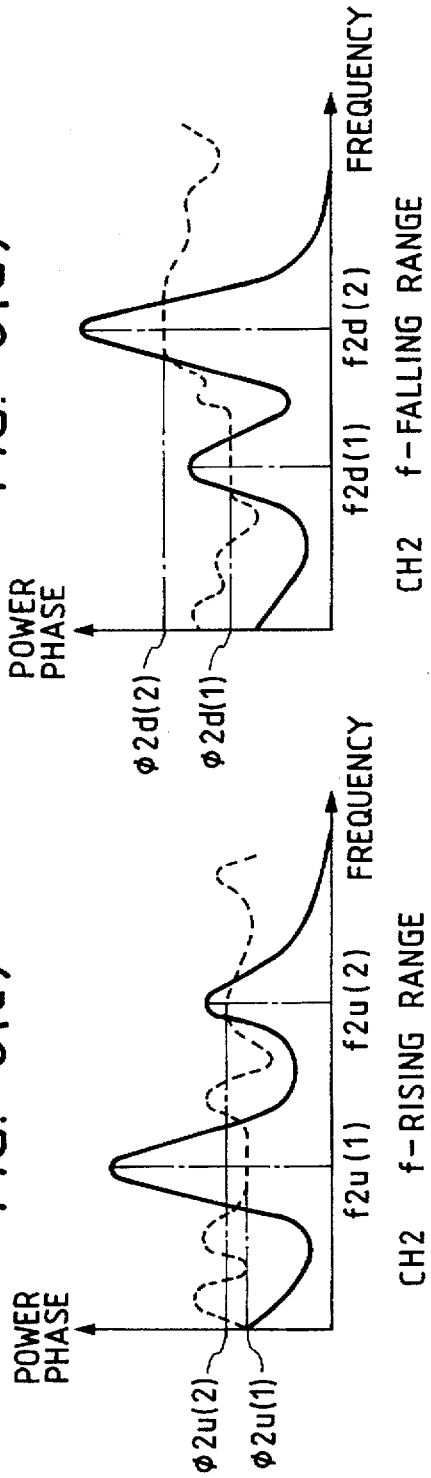

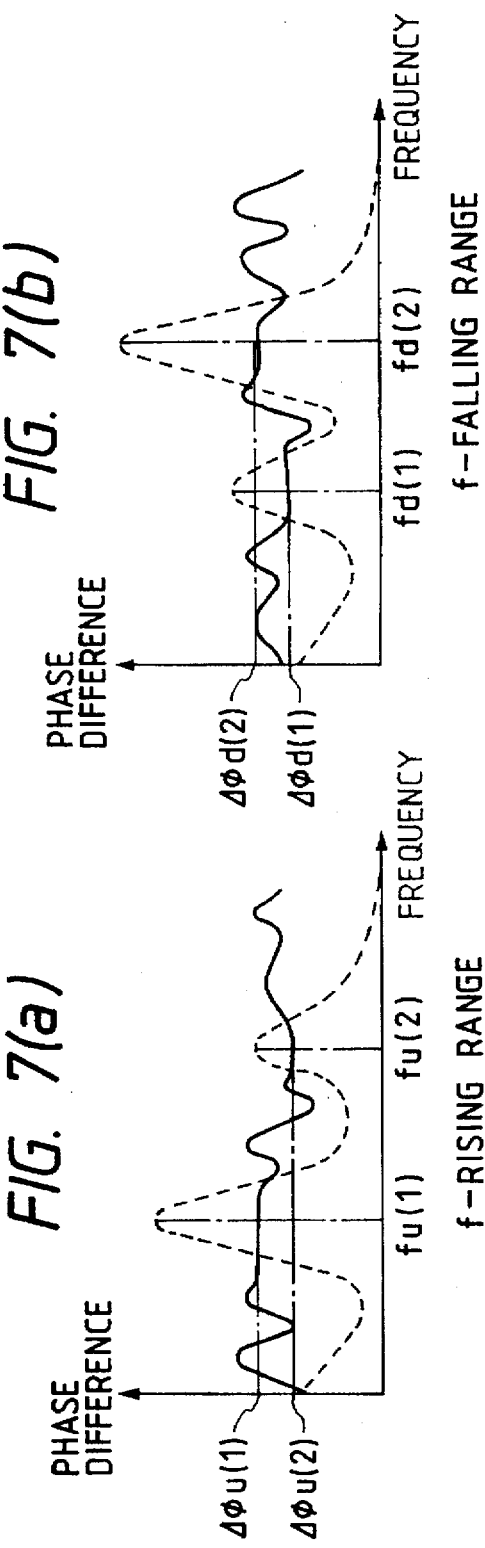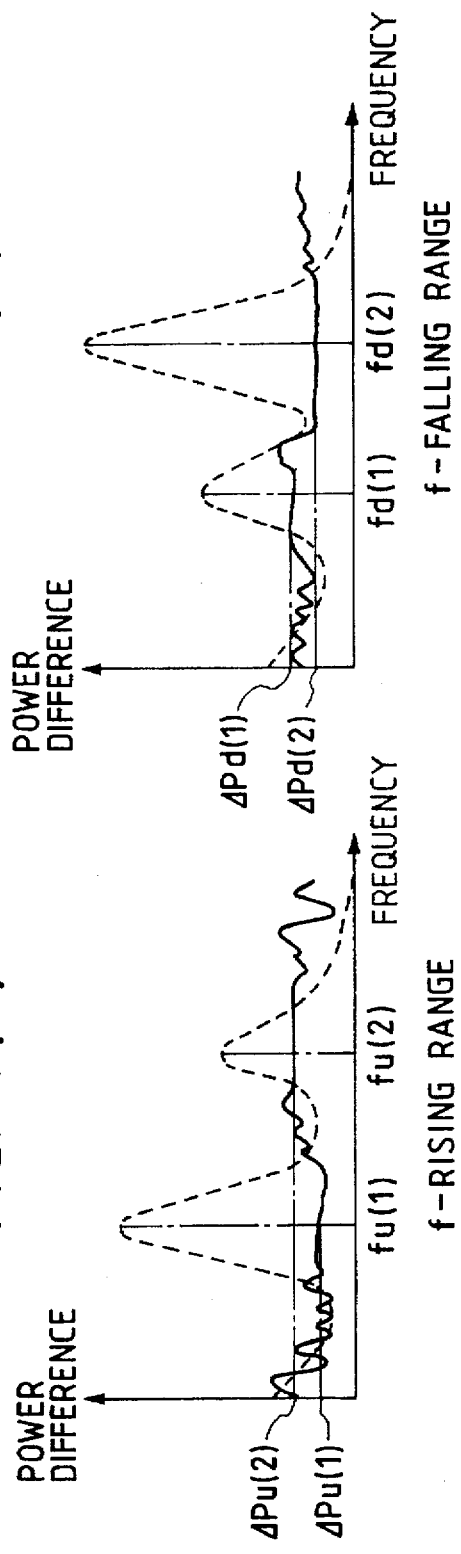

FM-CW RADAR APPARATUS FOR MEASURING RELATIVE SPEED OF AND DISTANCE TO AN OBJECT

BACKGROUND OF THE INVENTION

1. Technical Field

The present invention relates generally to an FM-CW radar system which may be employed in an automotive anti-collision system and a constant inter-vehicle distance controlling system designed to measure the distance to and relative speed of a radar-detected object or target present ahead of the vehicle.

2. Background of Related Art

In general, an FM-CW radar emits a transmit signal in the form of a radar wave whose frequency is modulated by a triangular modulation signal so that it varies gradually and then mixes a radar wave reflected from a target object with the transmit signal to produce a beat signal. A signal processor measures the frequencies (generally called the beat frequency) of the beat signal in a frequency-rising range where the frequency of the transmit signal rises and in a frequency-falling range where the frequency of the transmit signal falls to determine the distance D to and relative speed V of the target object using the beat frequency $fb_1$ in the frequency-rising range and the beat frequency $fb_2$ in the frequency-falling range according to the following equations (1) and (2).

$$D = \frac{C}{8 \cdot \Delta F \cdot fm} \cdot (fb1 + fb2) \quad (1)$$

$$V = \frac{C}{4 \cdot f0} \cdot (fb1 - fb2) \quad (2)$$

where $\Delta F$ is a variation in frequency of the transmit signal, $f0$ is the central frequency of the transmit signal, $1/fm$ is the time required for modulation in one cycle, and C is the light velocity.

FIGS. 13(a) and 13(b) are graphs which show variations in frequency of a transmit signal T transmitted from a radar and a received signal R.

When traveling speeds of a moving object equipped with a radar and a target are equal to each other (i.e., a relative speed V=0), a radar wave reflected by the target is received after a period of time required for the radar wave to reach and return from the target. The waveform of the frequency of the received signal R thus, as shown in FIG. 13(a), agrees with that of the frequency of the transmit signal T shifted along an axis of time (i.e., an abscissa axis), so that the beat frequency $fb_1$ in the frequency-rising range will be equal to the beat frequency $fb_2$ in the frequency-falling range ($fb_1 = fb_2$).

When the traveling speeds of the moving object equipped with the radar and the target are different from each other (i.e., the relative speed V≠0), the radar wave reflected by the target is, as shown in FIG. 13(b), subjected to the Doppler shift. The waveform of the frequency of the received signal R thus agrees with that of the frequency of the transmit signal T shifted along a frequency axis (i.e., an ordinate axis) by the degree of the Doppler shift, so that the beat frequency $fb_1$ in the frequency-rising range will be different from the beat frequency $fb_2$ in the frequency-falling range ($fb_1 \neq fb_2$).

When a single target is detected, a single frequency component of the beat signal appears in each of the frequency-rising and -falling ranges. The distance D and the relative speed V may thus be determined only using the above equations (1) and (2). However, when a plurality of targets are detected, frequency components of a number equal to the number of the targets appear in the frequency-rising and -falling ranges, respectively, thus requiring beat frequency components in the frequency-rising and falling ranges to be grouped by the target.

However, the beat frequency components derived by a wave reflected from the same target are not always arranged in the same order in the frequency-rising and -falling ranges. For example, when the beat frequency components are grouped in order of level thereof in the frequency-rising and -falling ranges, they are not always grouped properly, which may lead to a failure in determining the distance D and the relative speed V of each target.

Specifically, when two targets are detected, and the relative speeds V of a moving object equipped with a radar and the two targets are both about zero, received signals derived by reflected waves from the close target and the distant target vary as indicated by R1 and R2 in FIG. 14, respectively. Beat frequency components derived by reflected waves from the respective targets appear in the same order in the frequency-rising and -falling ranges ($fb_1(R1)<fb_1(R2)$, $fb_2(R1)<fb_2(R2)$).

However, when the distant target is moving at the relative speed V, it will cause the received signal R2' subjected to the Doppler shift to be equal to the received signal R2 shifted along the frequency axis, so that the beat frequency components derived by reflected waves from the respective targets appear in different orders in the frequency-rising and -falling ranges ($fb_1(R1)>fb_1(R2)$, $fb_2(R1)<fb_2(R2)$). Specifically, the level of the beat frequency component is changed depending upon a condition of each target. It is thus difficult to determine the distance D and the relative speed V by grouping the beat frequency components in the frequency-rising and -falling rages by the target in a simple manner.

SUMMARY OF THE INVENTION

It is therefore a principal object of the present invention to avoid the disadvantages of the prior art.

It is another object of the present invention to provide an FM-CW radar designed to determine distances to and relative speeds of a plurality of radar-detected objects or targets correctly.

According to one aspect of the present invention, there is provided an FM-CW radar system which comprises: (a) a radar wave transmitting means for transmitting a radar wave having a frequency increased at a given rate and decreased at a given rate; (b) a radar wave receiving means for receiving a radar wave reflected from an object present in a radar detection range to mix the radar wave transmitted from the radar wave transmitting means with the radar wave received by the radar wave receiving means to produce a beat signal; (c) a first means for taking the Fourier transform of the beat signal in a frequency-rising range wherein the frequency of the radar wave transmitted from the radar wave transmitting means is increased and a frequency-falling range wherein the frequency of the radar wave transmitted from the radar wave transmitting means is decreased to derive frequency components, the first means selecting peak frequency components showing peaks in a frequency spectrum of the derived frequency components in the frequency-rising range and the frequency-falling range, respectively; (d) a second means for determining phases of the peak frequency components selected by the first means; (e) a third means for comparing the phases of the peak frequency components in the frequency-rising range with the phases of the peak frequency components in the frequency-falling range to pair at least one of the frequency components in the frequency-rising range with at least one of the frequency components in the frequency-falling range which show a preselected relation between the phases thereof as being derived based on the radar wave reflected from the same object; and (f) a fourth means for determining a distance to and a relative speed of the object based on frequencies of the peak frequency components paired by the third means.

According to another aspect of the invention, there is provided an FM-CW radar system which comprises: (a) a radar wave transmitting mesas for transmitting a radar wave having a frequency increased at a given rate and decreased at a given rate; (b) a first radar wave receiving means for receiving a radar wave reflected from an object present in a radar detection range to mix the radar wave transmitted from the radar wave transmitting means with the radar wave received by the first radar wave receiving means to produce a first beat signal; (c a second radar wave receiving means for receiving a radar wave reflected from an object present in the radar detection range to mix the radar wave transmitted from the radar wave transmitting means with the radar wave received by the second radar wave receiving means to produce a second beat signal; (d) a first means for taking the Fourier transform of the first and second beat signals in a frequency-rising range wherein the frequency of the radar wave transmitted from the radar wave transmitting means is increased and a frequency-falling range wherein the frequency of the radar wave transmitted from the radar wave transmitting means is decreased to derive frequency components of the first and second beat signals, the first means selecting peak frequency components showing peaks in frequency spectra of the derived frequency components of the first and second beat signals in the frequency-rising range and the frequency-falling range, respectively; (e) a second means for determining first complex vectors of the peak frequency components of the first beat signal derived by the first means; (f) a third means for determining second complex vectors of the peak frequency components of the second beat signal derived by the first means; (g) a fourth means for determining correlations between the first and second complex vectors of the peak frequency components determined by the second and third means in each of the frequency-rising range and the frequency-falling range, shorting substantially the same frequency; (h) a fifth means for comparing the correlations between the first and second complex vectors of the peak frequency components in the frequency-rising range with the correlations between the complex vectors of the peak frequency components in the frequency-falling range to determine at least one pair of the peak frequency components showing substantially the same correlation; (i) a sixth means for determining a distance to and relative speed of the object based on a frequency of the pair of the peak frequency components determined by the fifth means.

In the preferred mode of the invention, the second means determines first phases of the peak frequency components of the first beat signal based on the first complex vectors. The third means determines second phases of the peak frequency components of the second beat signal based on the second complex vectors. The fourth means determines differences between the first and second phases, respectively, as the correlations.

In a modified form, the second means determines first amplitudes of the peak frequency components of the first beat signal based on the first complex vectors. The third means determines second amplitudes of the peak frequency components of the second beat signal based on the second complex vectors. The fourth means determines the correlations between the first and second amplitudes, respectively. The correlations between the first and second amplitudes are differences between the first and second amplitudes.

In another modified form, the fourth means determines first differences between the first complex vectors of the peak frequency components and the second complex vectors of the peak frequency components in the frequency-rising range and second differences between the first complex vectors of the peak frequency components and the second complex vectors of the peak frequency components in the frequency-falling range. The fifth means compares the first differences with the second differences to determine at least one pair of the peak frequency components showing the first difference and the second difference equal to each other.

The fifth means may compare absolute values of the first differences with absolute values of the second differences to determine the at least one pair of the peak frequency components showing the absolute value of the first difference and the absolute value of the second difference equal to each other.

The first differences may be differences in bearing angle of the first complex vectors and the second complex vectors of the peak frequency components in the frequency-rising range, and the second differences may be differences in bearing angle of the first complex vectors and the second complex vectors of the peak frequency components in the frequency-falling range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 6(a) to 6(d) are graphs which show spectra of beat signals in a frequency-rising range wherein the frequency of a radar wave is increased and in a frequency-falling range wherein the frequency of the radar wave is decreased, derived through receiving channels CH1 and CH2;

FIGS. 7(a) to 7(d) are graphs which show phase differences and power differences of frequency components of the beat signals shown in FIGS. 6(a) to 6(d);

DESCRIPTION OF THE PREFERRED EMBODIMENT

Figure 1:
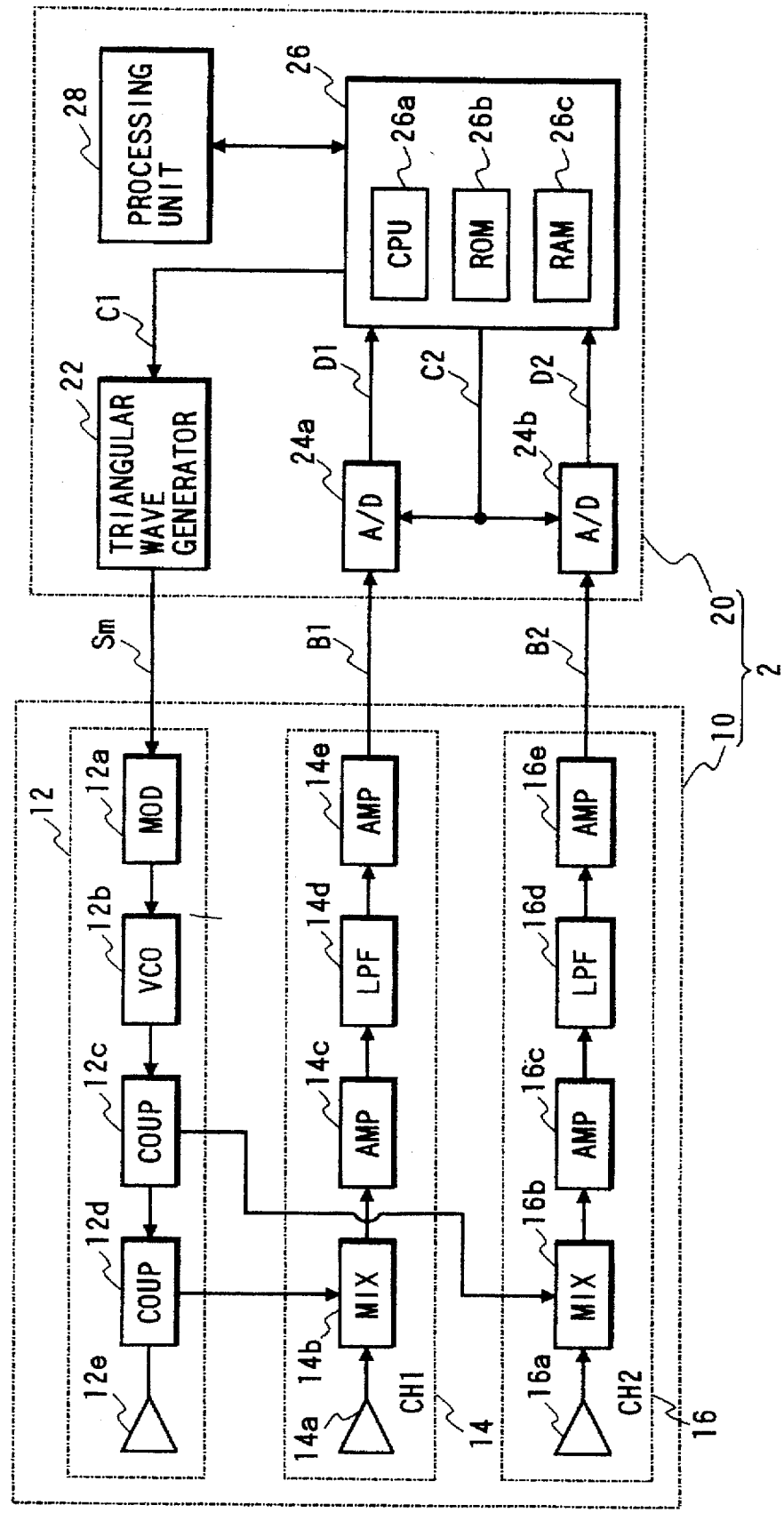
FIG. 1 is a block diagram which shows an FM-CW radar system according to the present invention.

Referring now to the drawings, particularly to FIG. 1, there is shown an obstacle-detecting radar system according to the present invention.

The obstacle-detecting radar system 2 includes generally a transceiver 10 and a signal processor 20.

The transceiver 10 includes a transmitter 12 and a pair of receivers 14 and 16. The transmitter 12 outputs a radar wave having a given frequency modulated based on a modulation signal Sm inputted from the signal processor 20. The receivers 14 and 16 receive the radar wave outputted from the transmitter 12, reflected from an object within a detectable zone. The signal processor 20 outputs the modulation signal Sm to the transmitter 12 and performs a given program to detect an object based on intermediate frequency beat signals B1 and B2 outputted from the receivers 14 and 16.

In the following discussion, it is assumed that the radar system 2 is mounted on an automotive vehicle for detecting objects present ahead of the vehicle.

The transceiver 10 is installed on the front of the vehicle body. The signal processor 20 is disposed within a cabin or on a given place near the cabin.

The transmitter 12 includes a voltage-controlled oscillator (VCO) 12b producing a high-frequency signal in a millimeter wave band, a modulator (MOD) 12a converting the modulation signal Sm to a signal of an adjusting level for the voltage-controlled oscillator 12b to provide it to the voltage-controlled oscillator 12b, power distributors (i.e., couplers) 12c and 12d distributing a signal output from the voltage-controlled oscillator 12b in power to the receivers 14 and 16, and an antenna 12e emitting the radar wave based on the signal output from the voltage-controlled oscillator 12b.

The receiver 14 includes an antenna 14a receiving the radar wave, a mixer 14b mixing a received signal of the antenna 14a with a local signal from the power distributor 12d, an amplifier 14c amplifying an output signal from the mixer 14b, a low-pass filter 14d removing unwanted high-frequency components of an output signal of the amplifier 14c to extract a beat signal B1 whose frequency is equal to the difference between frequencies of the transmit signal from the transmitter 12 and the received signal of the receiver 14, and an amplifier 14e amplifying the beat signal B1 to a required level.

The receiver 16 has the same circuit arrangements as those of the receiver 14 and receives the local signal from the power distributor 12c to provide a beat signal B2. In the following discussion, the receivers 14 and 16 will be sometimes referred to as receiving channels CH1 and CH2, respectively.

The signal processor 20 includes a triangular wave generator 22, A/D converters 24a and 24b, a microcomputer 26, and a processing unit 28. The triangular wave generator 22 is responsive to a starting signal C1 from the microcomputer 26 to generate the modulation signal Sm which is of triangular shape. The A/D converters 24a and 24b are responsive to starting signals C2 from the microcomputer 26 to convert the beat signals B1 and B2 from the receivers 14 and 16 into digital signals D1 and D2, respectively. The microcomputer 26 consists of a CPU 26a, a ROM 26b, and a RAM 26c, produces the starting signals C1 and C2 to control the triangular wave generator 22 and the A/D converters 24a and 24b, and performs a program, which will be described later in detail, to determine the distance to, the relative speed, and the direction of a target. The processing unit 28 is responsive to a control signal from the microcomputer 26 to perform an operation of the fast Fourier transform.

The A/D converters 24a and 24b are designed to convert the beat signals B1 and B2 into digital signals cyclically at given time intervals upon input of the starting signal C2 to store them at given storage locations of the RAM 26c and to set a completion flag in the RAM 26c to stop the operation thereof after a given number of A/D conversions.

When the triangular wave generator 22 is activated in response to the starting signal C1 to input the modulation signal Sm to the voltage-controlled oscillator 12b through the modulator 12a, the voltage-controlled oscillator 12b provides a transmit signal whose frequency is increased at a given rate according to an inclination of the triangular wave of modulation signal Sm in a range (hereafter, referred to as a frequency-rising range) wherein the triangular wave of the modulation signal Sm rises and then decreased at a given rate in a range (hereinafter, referred to as a frequency-falling range) wherein the triangular wave of the modulation signal Sm falls.

Figure 2:
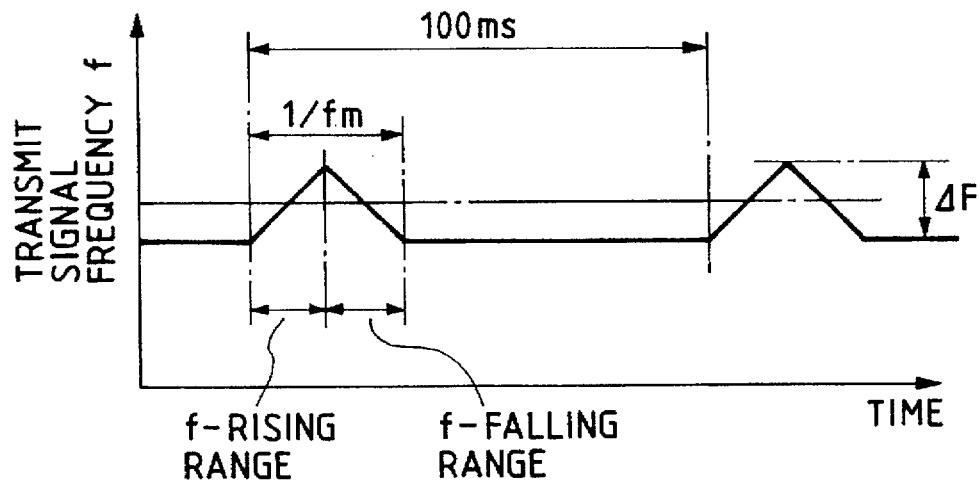
FIG. 2 is a graph which shows a variation in frequency of a radar wave transmitted from a radar system.

FIG. 2 shows a variation in frequency of the transmit signal. The frequency of the transmit signal is, as apparent from the drawing, modulated so that it is changed by ΔF across the central frequency f0 during a period of time 1/fm. This modulation is performed every cycle of 100 ms because an obstacle-detecting program, as will be discussed later, is performed at time intervals of 100 ms, and the starting signal C1 is provided every program cycle.

Figure 13A:
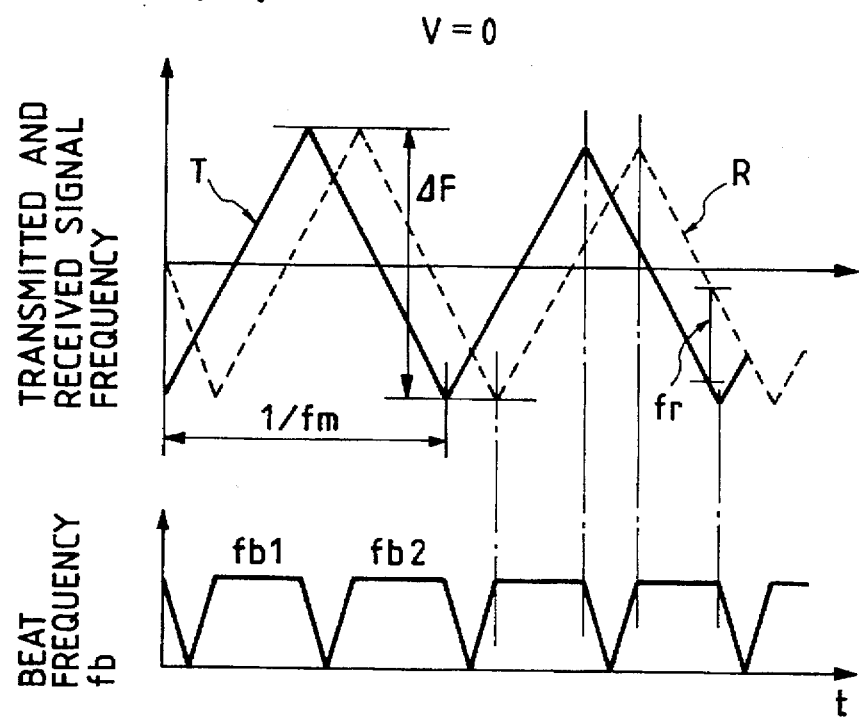
FIGS. 13(a) and 13(b) are graphs which show relations between waves transmitted and received by a radar system and beat signals when relative speed V of a target is zero and not zero.
Figure 13B:
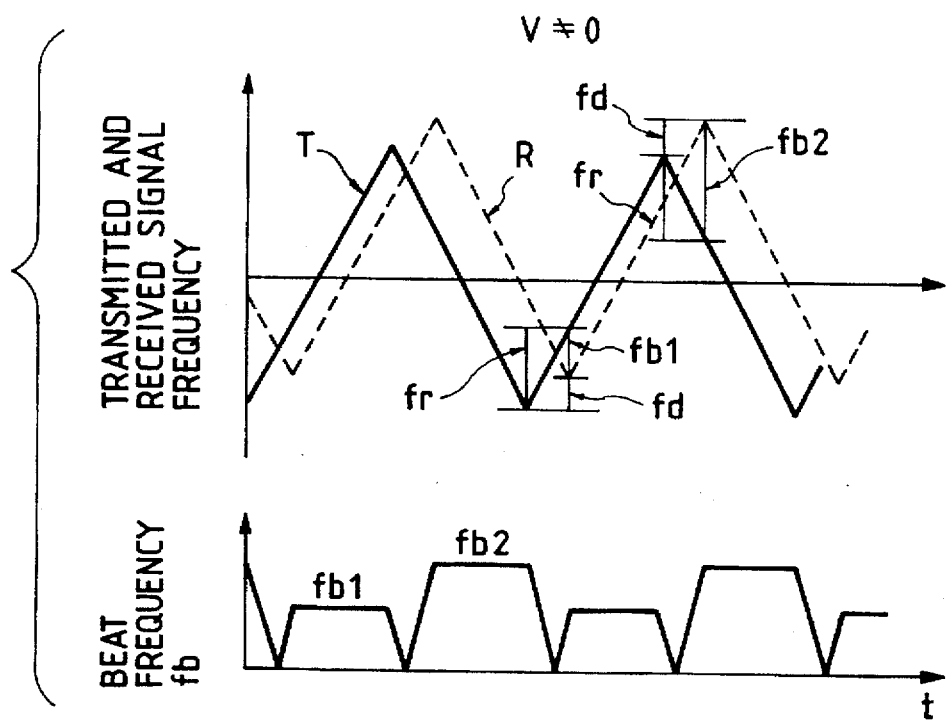
Figure 14:
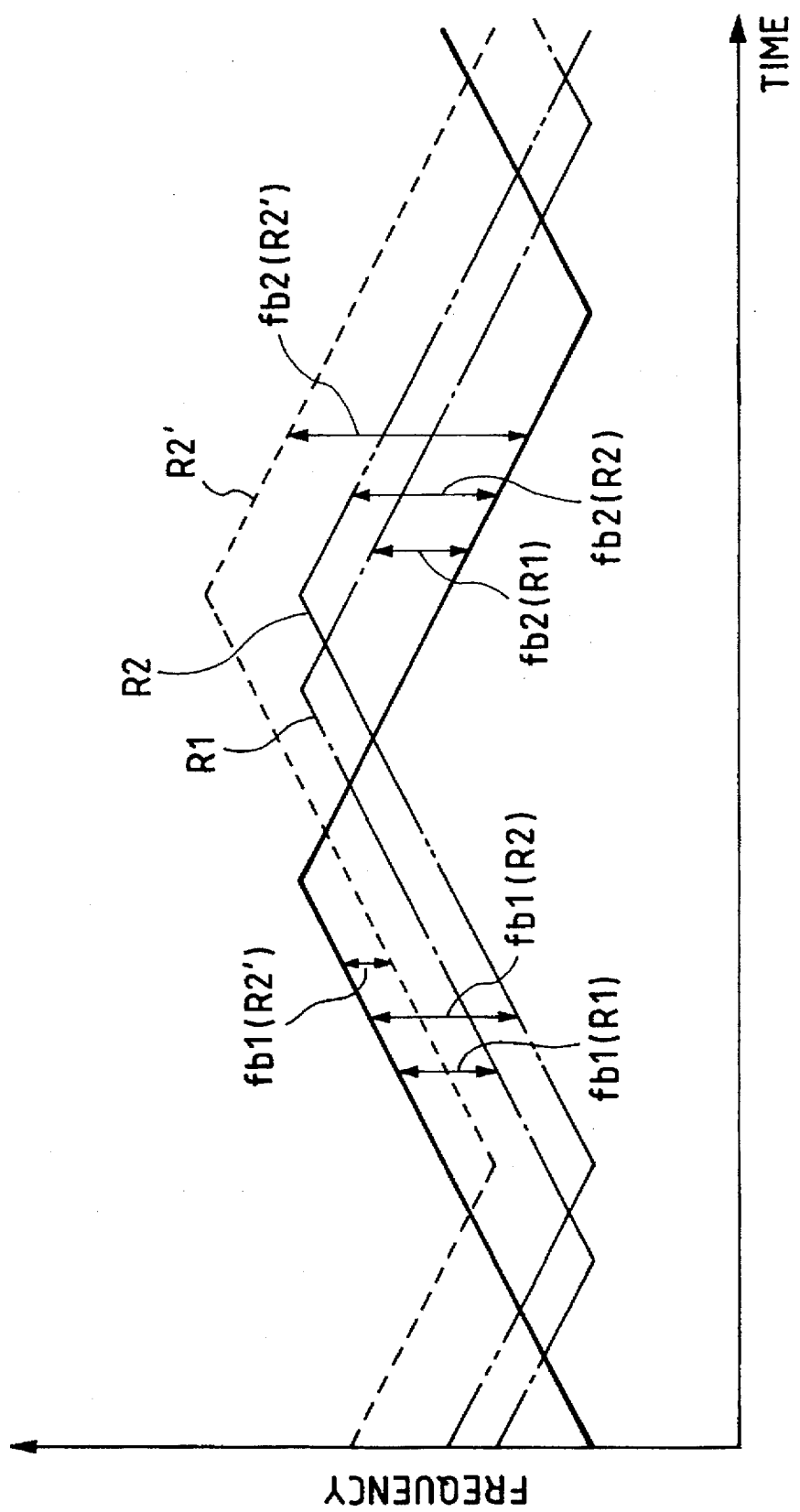
FIG. 14 shows variations in frequency of received signals and beat signals.

The transmitter 12 outputs a radar wave according to the transmit signal. The receivers 14 and 16 receive the radar wave reflected from an object present ahead of the vehicle. Specifically, the receivers 14 and 16 mix signals captured by the antennas 14a and 16a with the transmit signal from the transmitter 12 to produce the beat signals B1 and B2, respectively. Each of the received signals usually undergoes a delay of time during which the radar wave reaches the object and returns to the transceiver 10 and further undergoes the Doppler shift if the relative speed of the vehicle equipped with this system and the object is not zero. The beat signals B1 and B2 thus contain the above delay component fr and Doppler component fd as shown in FIG. 13(b).

Figure 3:
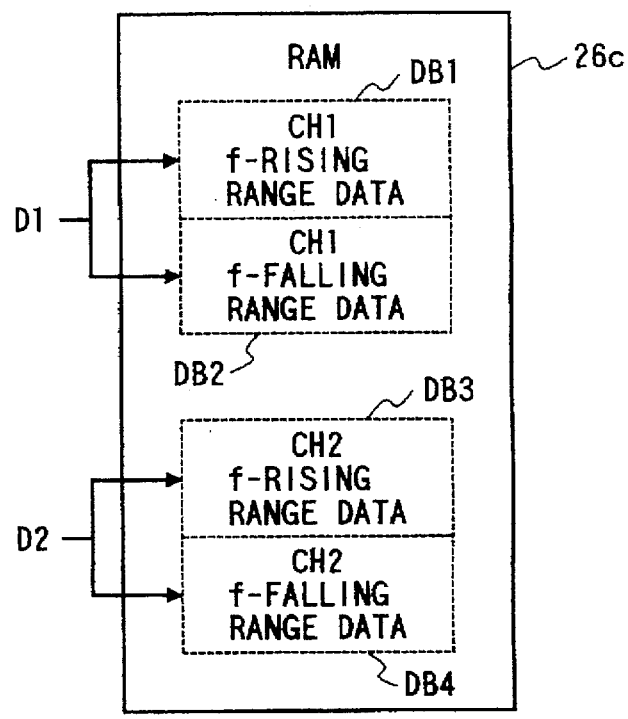
FIG. 3 is an illustration which shows storage locations of a RAM in a radar system wherein frequency components derived by beat signals are stored.

The digital signal D1 derived by converting the beat signal B1 through the A/D converter 24a is, as shown in FIG. 3, stored in data blocks DB1 and DB2 of the RAM 26c, while the digital signal D2 derived by converting the beat signal B2 through the A/D converter 24b is stored in data blocks DB3 and DB4 of the RAM 26c. Specifically, the A/D converters 24a and 24b are activated upon activation of the triangular wave generator 22 to perform a given number of A/D conversions while the modulation signal Sm is being outputted. The data derived by part of the transmit signal in the frequency-rising range through the first half of the A/D conversions are stored in the data blocks DB1 and DB3, while the data derived by part of the transmit signal in the frequency-falling range through the last half of the A/D conversions are stored in the data blocks DB2 and DB4.

The data thus stored in the data blocks DB1 to DB4 are used in the microcomputer 26 and the processing unit 28 for detecting a target existing in a detection range.

Figure 4:
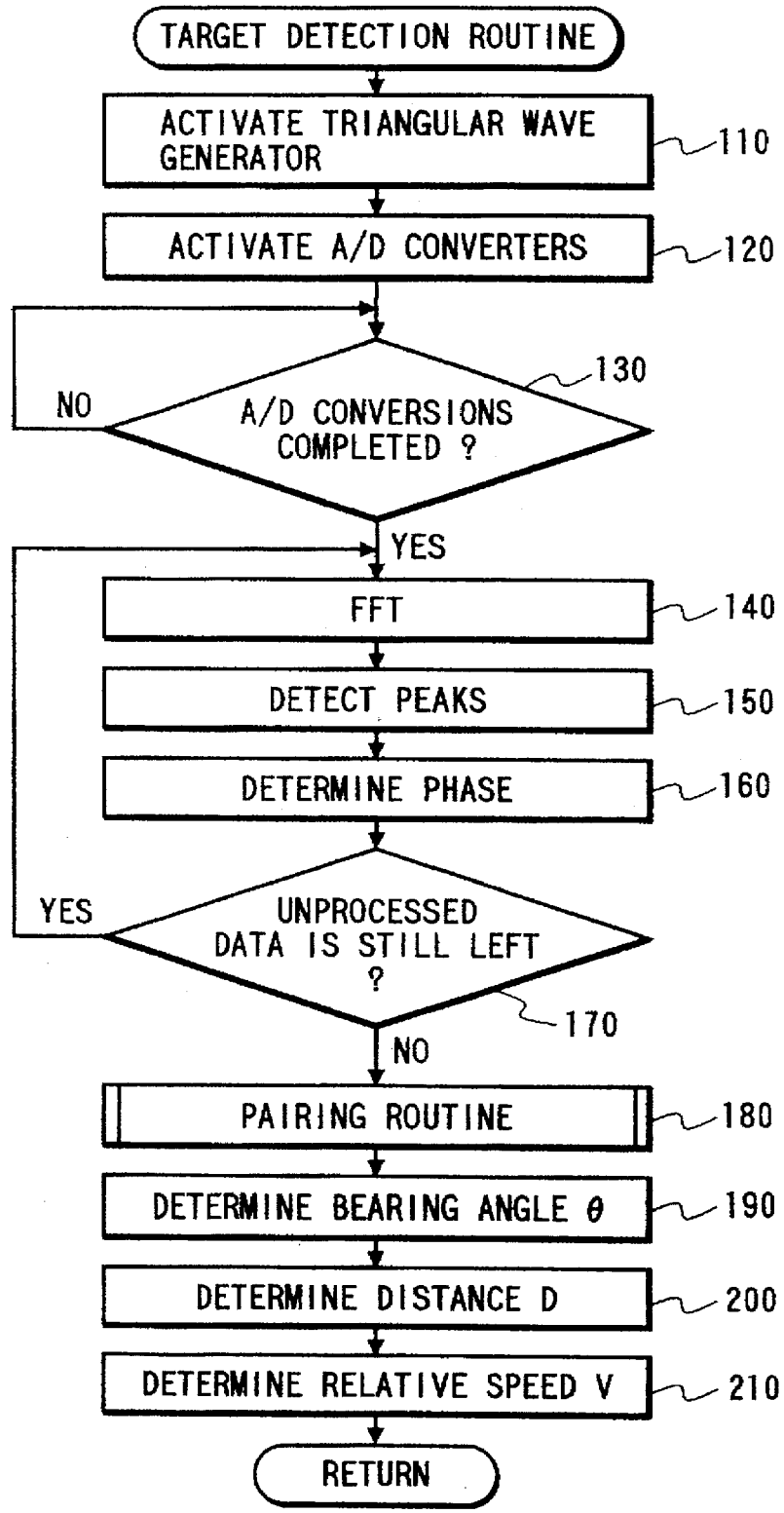
FIG. 4 is a flowchart of a program for determining distances to and relative speeds of radar-detected targets.

FIG. 4 shows a flowchart of a program or sequence of logical steps performed by the microcomputer 26 cyclically at time intervals of 100 ms.

After entering the program, the routine proceeds to step 110 wherein the starting signal C1 is provided to the triangular wave generator 22. The routine then proceeds to step 120 wherein the completion flag in the RAM 26c is cleared, and the starting signal C2 is provided to activate the A/D converters 24a and 24b. The transmitter 12 then receives the modulation signal Sm from the triangular wave generator 22 to emit a frequency-modulated radar wave. The receivers 14 and 16 receive the radar wave reflected from a target present ahead of the vehicle to produce the beat signals B1 and B2 which are, in turn, converted into the digital signals D1 and D2 through the A/D converters 24a and 24b and stored in the RAM 26c.

The routine then proceeds to step 130 wherein it is determined whether the operations of the A/D converters 24a and 24b are completed or not by checking the completion flag in the RAM 26c. If the completion flag is not set meaning that the A/D conversions are not yet finished, then step 130 is repeated. Alternatively, if the completion flag is set, then the routine proceeds to step 140.

In step 140, data stored in the data blocks DB1 to DB4 are inputted in sequence to the processing unit 28 to perform the fast Fourier transform. Specifically, the data inputted into the processing unit 28 is subjected to known window processing using the hanning window or the triangular window for restricting side lobes occurring in the operation of the Fourier transform. This produces a complex vector in each frequency (see equation (4) below).

The routine then proceeds to step 150 wherein all frequency components (hereinafter, referred to as peak frequency components) which show peaks in a frequency spectrum are detected based on absolute values $P_n$, as indicated in equation (5) below, of the complex vectors or the amplitudes of frequency components indicated by the complex vectors to determine peak frequencies. For example, the detection of each peak frequency component is achieved by monitoring a variation in amplitude of each frequency component in time sequence to determine a frequency at which the variation in amplitude is reversed in sign.

The routine then proceeds to step 160 wherein the phase $\phi_n$ of each of the peak frequency components is determined which is equal to the angle each of the complex vectors makes with the real axis and may be determined according to equations below.

Taking the Fourier transform of a given signal R(t), we obtain $$R(t) = \sum_{n=0}^{\infty} \{a_n \cos n\omega t + b_n \sin n\omega t\} \quad (3)$$

Expressing the equation (3) using complex numbers, we obtain $$= \sum_{n=0}^{\infty} \{(ja_n + b_n) \cdot \exp(jn\omega t)\} \quad (4)$$

It will be noted that a complex vector consisting of a real number component $b_n$ and an imaginary number component an is determined in each frequency that is an n multiple of a fundamental frequency f ($=\omega/2\pi$).

$$P_n = \sqrt{b_n^2 + a_n^2} \quad (5)$$

$$\phi_n = \tan^{-1}\frac{a_n}{b_n} \quad (6)$$

The routine then proceeds to step 170 wherein it is determined whether unprocessed data is still stored in any of the data blocks DB1 to DB4 or not. If a YES answer is obtained, then the routine returns back to step 140 and performs the operations of steps 140 to 160 on the unprocessed data. Alternatively, if a NO answer is obtained, then the routine proceeds to step 180.

FIGS. 6(a) to 6(d) show spectra of amplitudes (i.e., power) and phases of signals in the data blocks DB1 to DB4, which are derived based on the complex vectors determined in step 140. Note that in each drawing, there are two objects in the detection range so that two peak frequency components are determined in each of the data blocks DB1 to DB4.

In operation of steps 150 and 160, peak frequencies f1$zzu$ (1) and f1$u$(2) in the frequency-rising range derived through the receiving channel CH1, peak frequencies f1$d$(1) and f1$d$(2) in the frequency-falling range derived through the receiving channel CH1, peak frequencies f2$u$(1) and f2$u$(2) in the frequency-rising range derived through the receiving channel CH2, peak frequencies f2$d$(1) and f2$d$(2) in the frequency-failing range derived through the receiving channel CH2, and the phases $\phi 1u(1)$, $\phi 1u(2)$, $\phi 1d(1)$, $\phi 1d(2)$, $\phi 2u(1)$, $\phi 2u(2)$, $\phi 2d(1)$, and $\phi 2d(2)$ of their peak frequencies are determined.

The same peak frequency components appearing in each of the frequency-rising and -falling ranges at the channels CH1 and CH2 (i.e., f1$u$(1)=f2$u$(1), f1$u$(2)=f2$u$(2), f1$d$(1)= f2$d$(1), and f1$d$(2)=f2$d$(2)) are frequency components derived by a radar wave reflected by the same object.

Referring back to FIG. 4, the routine proceeds to step 180 wherein a pairing operation is performed to pair each of the peak frequency components in the frequency-rising range with one of the peak frequency components in the frequency-falling range in the following manner.

Figure 5:
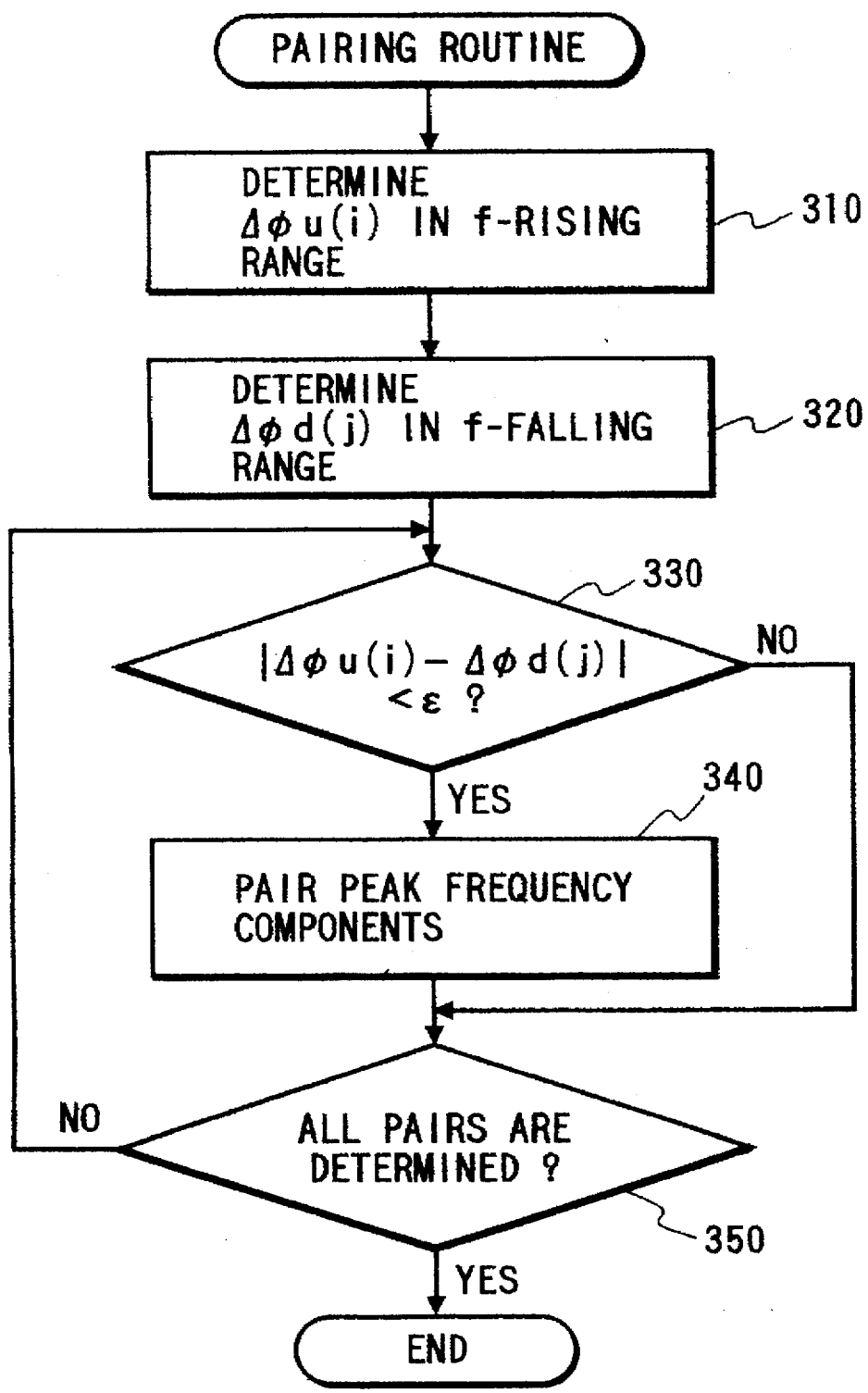
FIG. 5 is a flowchart of a program for pairing frequency components derived by beat signals performed in the program of FIG. 4.

Upon entering step 180, the routine proceeds to step 310 in a subroutine, as shown in FIG. 5, wherein the phase difference between two of the peak frequency components derived through the channels CH1 and CH2 showing the same frequency in the frequency-rising range, that is, the phase difference $\Delta\phi u(i)$ between the peak frequency components derived by a wave reflected from the same target is determined according to the equation (7) below. The routine then proceeds to step 320 wherein the phase difference $\Delta\phi d(j)$ between the peak frequency components having the same frequency in the frequency-falling range at the channels CH1 and CH2 is determined according to the equation (8) below.

$$\Delta\phi u(i)=|\phi 1u(i)-\phi 2u(i)| \quad (7)$$

$$\Delta\phi d(j)=|\phi 1d(j)-\phi 2d(j)| \quad (8)$$

where i and j=1 to Np that is the number of the peak frequency components derived in step 150.

The routine then proceeds to step 330 wherein the peak frequency components are selected one from each of the frequency-rising and -falling ranges to determine an absolute value of a difference between the phase differences $\Delta\phi u(i)$ and $\Delta\phi d(j)$ thereof (i.e., $|\Delta\phi u(i)-\Delta\phi d(j)|$) derived in steps 310 and 320, and it is determined whether this absolute value is smaller than a given value $\epsilon$ or not. This determination is performed for each of all possible combinations of the peak frequency components in the frequency-rising and -falling ranges. If a YES answer is obtained meaning that the absolute value is smaller than ε, the phase differences Δϕu(i) and Δϕd(j) are determined to be equal to each other, and the routine proceeds to step 340. Alternatively, if a NO answer is obtained, it is concluded that the phase differences Δϕu(i) and Δϕd(j) are different from each other, and the routine proceeds to step 350.

In step 340, the peak frequency components whose phase differences Δϕu(i) and Δϕd(j) are determined to be equal to each other are paired and stored in given storage locations of the RAM 26c.

The routine then proceeds to step 350 it is determined whether pairs of all the peak frequency components in the frequency-rising and -falling ranges are determined or not. If a NO answer is obtained, then the routine returns back to step 330. If a YES answer is obtained, then the routine terminates.

FIGS. 7(a) and 7(b) show the phase differences Δϕu(1), Δϕu(2), Δϕd(1), and Δϕd(2) of the peak frequency components in the frequency-rising and -falling ranges which are paired in step 340. Specifically, since Δϕu(1)=Δϕd(2) and Δϕu(2)=Δϕd(1), the peak frequency components having the peak frequencies fu(1) and fd(2) are paired with each other, while the peak frequency components having the peak frequencies fu(2) and fd(1) are paired with each other.

After step 450, the routine proceeds to step 190 in FIG. 4 wherein a bearing angle θ of a target corresponding to each of the peak frequency components is determined based on the difference between the phase differences (i.e., ϕ1u(i)−ϕ2u(i)) derived in step 310 according to the equation (9) below.

$$\theta = (\phi 1u(i) - \phi 2u(i)) \cdot \lambda / (2\pi \cdot W) \quad (9)$$

where W is the distance between the receivers 14 and 16, d is the difference in length between travel paths of reflected waves from the same target, received by the receivers 14 and 16, and λ and the wave length of a radar wave outputted from the transmitter 12. Note that the difference between the phase differences ϕ1d(j)−ϕ2d(j) may be used instead of ϕ1u(i)−ϕ2u(i).

The routine then proceeds to step 200 wherein the distance D to each target present in the detection range is determined according to the equation (1) using the beat frequencies fu(i) and fd(j) in the frequency-rising and -falling ranges which are paired in step 180. The routine then proceeds to step 210 wherein the relative speed V of each target is determined according to the equation (2) and terminates. Note that the beat frequencies fu(i) and fd(j) correspond to fb1 and fb2 in the equation (1), respectively.

The distances D, the relative speeds V, and the bearing angles θ are used in another program to determine possibilities of collisions with the objects present ahead of the vehicle. For example, if it is concluded that there is the possibility of collision, an alarm is raised to inform a driver of danger of collision.

As discussed above, the radar system of this embodiment detects the peak frequency components contained in the beat signal in each of the frequency-rising and -falling ranges at each of the channels CH1 and CH2 to determine the differences in complex vector or the phase differences Δϕu(i) and Δϕd(j) of the peak frequency components based on a wave reflected from the same target received through the channels CH1 and CH2. The phase difference Δϕu(i) in the frequency-rising range is then compared with the phase difference Δϕd(j) in the frequency-falling range to pair the peak frequency components showing the same phase difference (i.e., Δϕu(i)=Δϕd(j)) in the frequency-rising and -falling ranges as being derived by the wave reflected from the same target. Specifically, since the bearing angle of the target is hardly changed for a short period of time (i.e., time interval from the frequency-rising range to the frequency-falling range), the phase differences between the channels CH1 and CH2 in the frequency-rising and -falling ranges may be determined to form the pair of the peak frequency components of the wave reflected from the same target correctly.

The phase differences Δϕu(i) and Δϕd(j) of the peak frequency components derived by the wave reflected from the same target, determined in the receivers 14 and 16 (i.e., the channels CH1 and CH2) usually change according to the bearing angle of the target, however, in the radar system of this embodiment, even if there are a plurality of targets in different directions, the peak frequency components derived by the beat signals B1 and B2 produced by a wave reflected from the same target are paired correctly in the frequency-rising and -falling ranges, thus determining the distance D and the relative speed V of each target within the radar detection range correctly.

Figure 8:
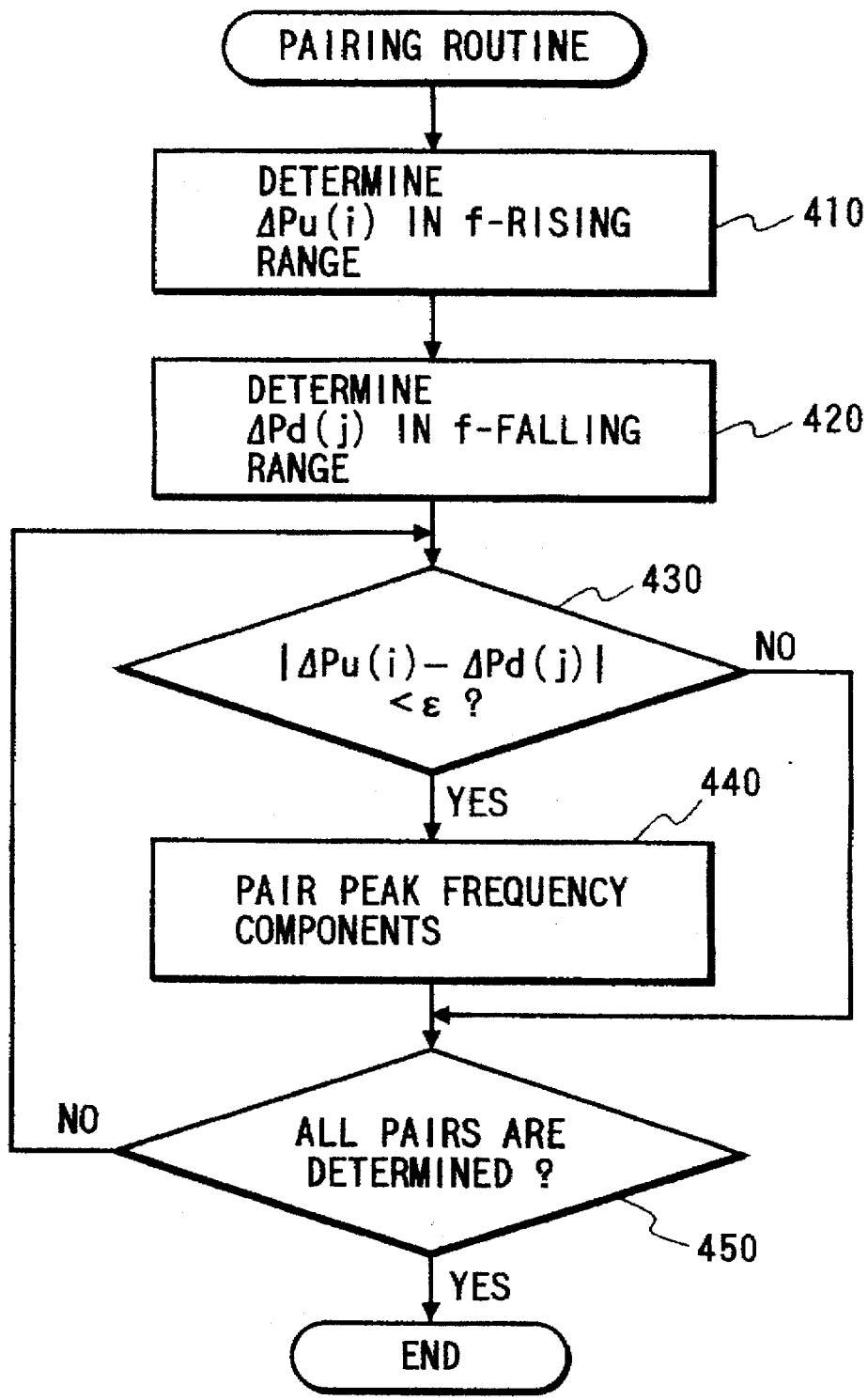
FIG. 8 is a flowchart of the second modification of the paring program shown in FIG. 5.

FIG. 8 shows the second embodiment of the object-detecting program performed by the radar system which is different from that in the above first embodiment in the pairing operation and determination of the bearing angle θ carried out in steps 180 and 190 of FIG. 4.

Specifically, while in the first embodiment, the pairing of the peak frequency components derived by taking the Fourier transformation of the beat signals B1 and B2 is performed based on the phase differences thereof, this second embodiment uses the power differences derived by amplitudes of the peak frequency components instead of the phase differences.

After entering step 180 of FIG. 4, the routine proceeds to step 410 wherein the difference in power ΔPu(i) between the peak frequency components derived through the channels CH1 and CH2 showing substantially the same frequency in the frequency-rising range is determined according to the equation (10) below. Similarly, in step 420, the difference in power ΔPd(j) between the peak frequency components derived through the channels CH1 and CH2 showing substantially the same frequency in the frequency-falling range is determined according to the equation (11) below.

$$\Delta Pu(i) = P1u(i) - P2u(i) \quad (10)$$

$$\Delta Pd(j) = P1d(j) - P2d(j) \quad (11)$$

where i and j=1 to Np, and Np is the number of the peak frequency components derived in step 150. The powers P1u(i), P2u(i), P1d(j), and P2d(j) are determined by values derived in determination of the peak frequency components in step 150.

The routine then proceeds to step 430 wherein the peak frequency components are selected one from each of the frequency-rising and -falling ranges to determine an absolute value of a difference between the power differences ΔPu(i) and ΔPd(j) (i.e., |ΔPu(i)−ΔPd(j)|) of the selected peak frequency components, and it is determined whether this absolute value is smaller than a given value ε or not. This determination is performed in each of all possible combinations of the peak frequency components in the frequency-rising and -falling rages. If a YES answer is obtained meaning that the absolute value is smaller than ε, the phase differences ΔPu(i) and ΔPd(j) are determined to be equal to each other, and the routine proceeds to step 440. Alternatively, if a NO answer is obtained, it is concluded that the phase differences ΔPu(i) and ΔPd(j) are different from each other, and the routine proceeds to step 450.

The operations in steps 440 and 450 are similar to those in steps 340 and 350, and explanation thereof in detail will be omitted here.

FIGS. 7(c) and 7(d) show the power differences ΔPu(1), ΔPu(2), ΔPd(1), and ΔPd(2) of the peak frequency components in the frequency-rising and -falling ranges which are paired in step 440. Since ΔPu(1)=ΔPd(2) and ΔPu(2)=ΔPd (1), the peak frequency components having the peak frequencies fu(1) and fd(2) are paired with each other, while the peak frequency components having the peak frequencies fu(2) and fd(1) are paired with each other.

The power differences ΔPu(i) and ΔPd(j) of the peak frequency components derived by a reflected wave from the same target existing in the radar detection range, derived through the channels CH1 and CH2 usually change according to a bearing angle of the target similar to the phase differences Δφu(i)=Δφd(j) as discussed in the first embodiment, however, in the radar system of this embodiment, even if there are a plurality of targets in different directions, the peak frequency components derived by the beat signals B1 and B2 produced by a wave reflected from the same target are paired correctly in the frequency-rising and -falling ranges, thus determining the distance D and the relative speed V of each target within the radar detection range correctly.

The determination of the bearing angle θ of the target in this embodiment is achieved by providing before step 190 an additional step wherein the difference between the phase differences $\phi1u(i)$ and $\phi2u(i)$ derived in step 160 is determined. The bearing angle θ may alternatively be determined based on only the difference ΔPu(i) or ΔPd(j) of the power differences derived in step 410 or 420 or both the differences between the phase differences and between the power differences.

Figure 9:
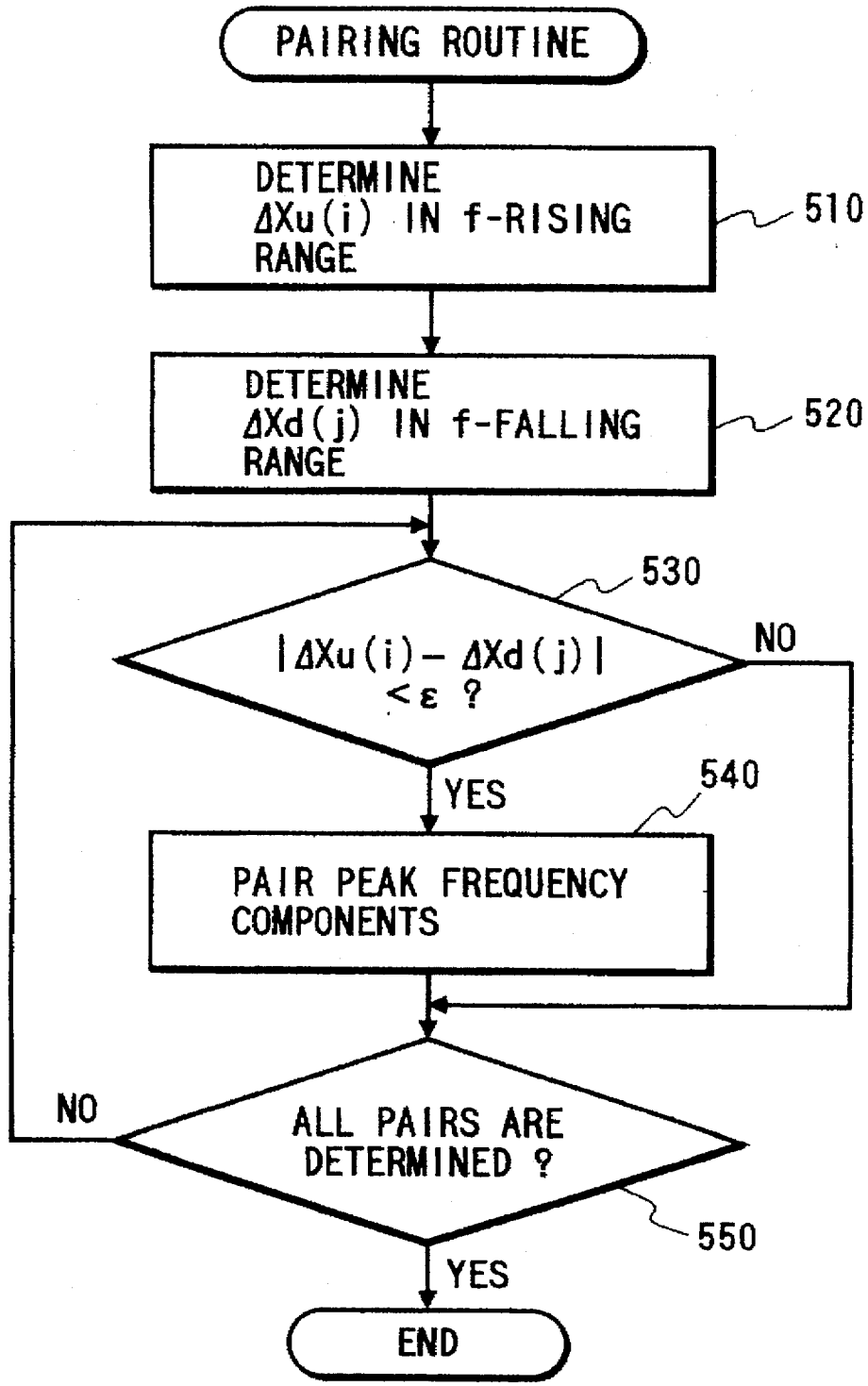
FIG. 9 is a flowchart of the third modification of the paring program shown in FIG. 5.

FIG. 9 shows the third embodiment of the object-detecting program which is different from that in the above first embodiment in the pairing operation and determination of the bearing angle θ carried out in steps 180 and 190 of FIG. 4. Specifically, the pairing of the peak frequency components derived by taking the Fourier transform of the beat signals B1 and B2 is achieved using absolute values of complex vectors instead of the phase differences and the power differences used in the first and second embodiments.

After entering step 180 of FIG. 4, the routine proceeds to step 510 wherein an absolute value ΔXu(i) of a difference in complex vector between the peak frequency components derived through the channels CH1 and CH2 showing substantially the same frequency in the frequency-rising range is determined according to the equation (12) below. Similarly, in step 520, absolute value ΔXd(j) of a difference in complex vector between the peak frequency components derived through the channels CH1 and CH2 showing substantially the same frequency in the frequency-falling rage is determined according to the equation (13) below.

$$\Delta Xu(i)=XP1u(i)-X2u(i) \quad (12)$$

$$\Delta Xd(j)=X1d(j)-X2d(j) \quad (13)$$

where i and j=1 to Np, and Np is the number of the peak frequency components derived in step 150.

The routine then proceeds to step 530 wherein the peak frequency components are selected one from each of the frequency-rising and -falling ranges to determine an absolute value |ΔXu(i)−ΔXd(j)| of a difference between the absolute value ΔXu(i) of the difference in complex vector and the absolute value ΔXd(j) of the difference in complex vector determined in steps 510 and 520, and it is determined whether this absolute value is smaller than a given value ε or not. This determination is performed in each of all possible combinations of the peak frequency components in the frequency-rising and -falling rages. If a YES answer is obtained meaning that the absolute value is smaller than ε, the absolute values ΔXu(i) and Δd(j) of the differences in complex vector are determined to be equal to each other, and the routine proceeds to step 540. Alternatively, if a NO answer is obtained, it is concluded that the absolute values ΔXu(i) and ΔXd(j) of the differences in complex vector are different from each other, and the routine proceeds to step 550.

The operations in steps 540 and 550 are similar to those in steps 340 and 350, and explanation thereof in detail will be omitted here.

Figure 10:
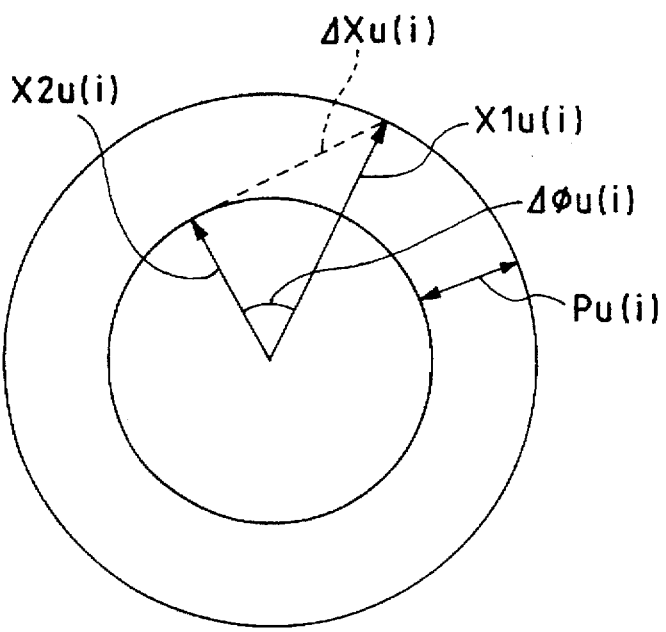
FIG. 10 is an illustration which shows absolute values of differences in complex vector.

The absolute value ΔXu(i) of the difference in complex vector is, as shown in FIG. 10, changed under the influence of both the phase difference Δφu(i) and the power difference ΔPu(i). The phase differences Δφu(i) and Δφd(j) and the power differences ΔPu(i) and ΔφPd(j) in the frequency-rising and -falling ranges derived by a reflected wave from the same target are, as discussed above, equal each other, so that the absolute values ΔXu(i) and ΔXd(j) of the differences in complex vector will be equal to each other in the frequency-rising and -falling ranges.

As apparent from the above discussion, in the third embodiment, the pairing operation is accomplished by using the absolute values ΔXu(i) and ΔXd(j) of the differences in complex vector including parameters of the phase differences Δφu(i) and Δφd(j) and the power differences ΔPu(i) and ΔPd(j). This results in greatly improved reliability of the paring operation.

The determination of the bearing angle θ of the target in this embodiment is achieved by providing before step 190 an additional step wherein the difference between the phase differences $\phi1u(i)$ and $\phi2u(i)$ derived in step 160 is determined. The bearing angle θ may alternatively be determined based on only the difference between the power differences P1u(i) and P2u(i) or both the differences between the phase differences and between the power differences.

Figure 11:
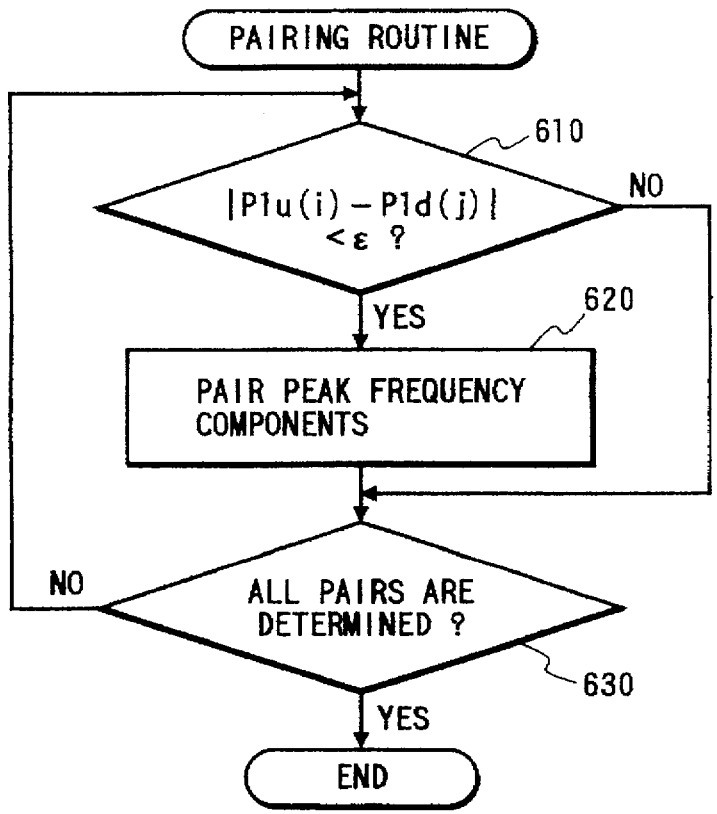
FIG. 11 is a flowchart of the fourth modification of the paring program shown in FIG. 5.

FIG. 11 shows the fourth embodiment of the object-detecting program which is different from that in the above first embodiment in the pairing operation and determination of the bearing angle θ carried out in steps 180 and 190 of FIG. 4. Specifically, the pairing of the peak frequency components derived by taking the Fourier transform of the beat signals B1 and B2 is achieved using the amplitudes of the peak frequency components instead of the phase differences, the power differences, and the absolute values of the differences in complex vector used in the first, second, and third embodiments.

After entering step 180 of FIG. 4, the routine proceeds to step 610 wherein the peak frequency components are selected one from each of the frequency-rising and -falling ranges to determine an absolute value |P1u(i)−P1d(j)| of a difference between the powers P1u(i) and P1d(j) based on the amplitudes of the peak frequency components derived in step 150, and it is determined whether this absolute value is smaller than a given value ε or not. This determination is performed in each of all possible combinations of the peak frequency components in the frequency-rising and falling ranges. If a YES answer is obtained meaning that the absolute value is smaller than α, the powers P1u(i) and P1d(j) are determined to be equal to each other, and the routine proceeds to step 620. Alternatively, if a NO answer is obtained, it is concluded that the powers P1$u$(i) and P1$d$(j) are different from each other, and the routine proceeds to step 630.

The operations in steps 620 and 630 are similar to those in steps 340 and 350, and explanation thereof in detail will be omitted here.

The powers P1$u$(i) and P1$d$(j) of the peak frequency components are usually changed according to the distance to the target, so that they will be equal to each other in the frequency-rising and -falling ranges if derived by a reflected wave from the same target. Thus, the peak frequency components derived by the same target are paired correctly in the frequency-rising and -falling ranges, so that the distance D and the relative speed V of each target within the radar detection range can be determined correctly.

The pairing operation of this embodiment can be performed based on the powers P1$u$(i) and P1$d$(j) or P2$u$(i) and P2$d$(j) of the peak frequency components derived by either of the receiving channels CH1 and CH2. This embodiment may thus be used with an FM-CW radar system having a single receiver.

The determination of the bearing angle θ of the target in this embodiment is achieved by providing before step 190 an additional step wherein the difference between the phase differences φ1$u$(i) and φ2$u$(i) derived in step 160 is determined. The bearing angle θ may alternatively be determined based on only the difference between the power differences P1$u$(i) and P2$u$(i) or both the differences between the phase differences and between the power differences.

Figure 12:
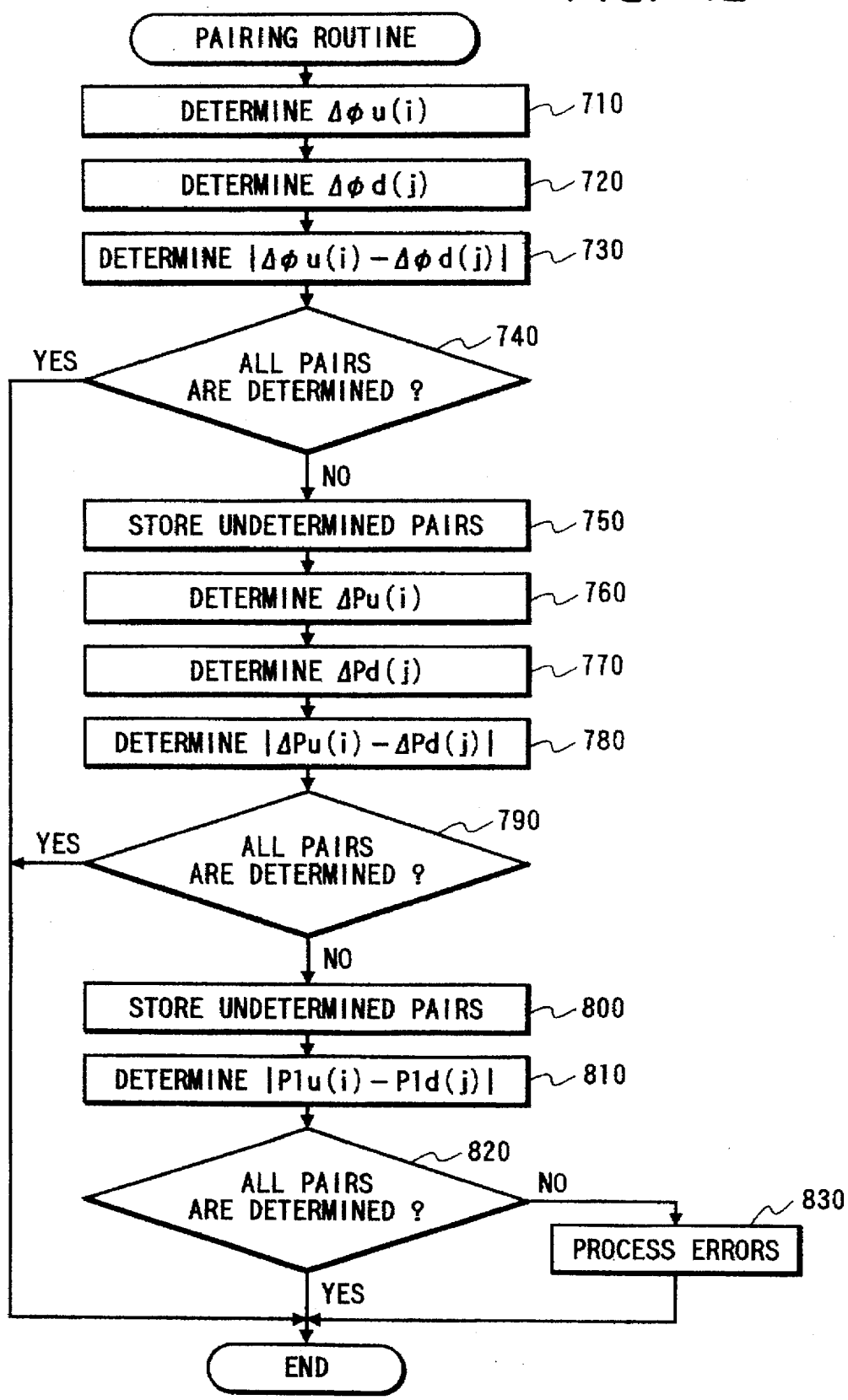
FIG. 12 is a flowchart of the fifth modification of the paring program shown in FIG. 5.

FIG. 12 shows the fifth embodiment of the paring of the peak frequency components in the frequency-rising and -falling ranges using the phase differences, the power differences, the absolute values of the differences in complex vector, and the powers employed in the above embodiments.

First, in step 710, the phase difference Δφu(i) between the peak frequency components derived through the channels CH1 and CH2 having the same frequency in the frequency-rising range is determined according to the equation (7) as discussed above. Similarly, in step 720, the phase difference Δφd(j) between the peak frequency components derived through the channels CH1 and CH2 having the same frequency in the frequency-falling range is determined according to the equation (8).

The routine then proceeds to step 730 wherein an absolute value of a difference between the phase differences Δφu(i) and Δφd(j) (i.e., |Δφu(i)–Δφd(j)| derived in steps 710 and 720 is determined in each of all possible combinations of the phase differences Δφu(i) and Δφd(j) in the frequency-rising and -falling ranges.

The routine then proceeds to step 740 wherein it is determined that each of the absolute values derived in step 730 is smaller than a given value or not. If a positive answer is obtained, then it is concluded that the phase differences Δφu(i) and Δφd(j) of a combination showing the absolute value smaller than the given value are determined to be equal to each other, and if the number of the peak frequency components of that combination is only one in each of the frequency-rising and -falling ranges, these peak frequency components are paired with each other. It is then determined whether pairs of all the peak frequency components in the frequency-rising and -falling ranges are derived or not. If a YES answer is obtained, then all the pairs are stored in the RAM 26c, and the routine terminates. Alternatively, if a NO answer is obtained, then the routine proceeds to step 750.

In step 750, the peak frequency components which are not paired in step 740 are stored in a given storage location of the RAM 26c.

The routine then proceeds to step 760 wherein the difference in power ΔPu(i) between the peak frequency components derived through the channels CH1 and CH2 stored in the RAM 26c in step 750 showing substantially the same frequency in the frequency-rising range is determined according to the equation (10). Similarly, in step 770, the difference in power ΔPd(j) between the peak frequency components derived through the channels CH1 and CH2 stored in the RAM 26c showing substantially the same frequency in the frequency-falling range is determined according to the equation (11).

The routine then proceeds to step 780 wherein an absolute value of a difference between the power differences ΔPu(i) and ΔPd(j) (i.e., |ΔPu(i)–ΔPd(j)|) derived in steps 760 and 770 is determined in each of all possible combinations of the power differences ΔPu(i) and ΔPd(j) in the frequency-rising and -falling ranges.

The routine then proceeds to step 790 wherein it is determined that each of the absolute values derived in step 780 is smaller than a given value or not. If a positive answer is obtained, then it is concluded that the power differences ΔPu(i) and ΔPd(j) of a combination showing the absolute value smaller than the given value are determined as being equal to each other, and if the number of the peak frequency components of that combination is only one in each of the frequency-rising and -falling ranges, these peak frequency components are paired with each other. It is then determined whether pairs of all the peak frequency components in the frequency-rising and -falling ranges are derived or not. If a YES answer is obtained, then all the pairs are stored in the RAM 26c, and the routine terminates. Alternatively, if a NO answer is obtained, then the routine proceeds to step 800.

In step 800, the peak frequency components which are not paired in step 790 are stored in a given storage location of the RAM 26c.

The routine then proceeds to step 810 wherein an absolute value of a difference between the powers P1$u$(i) and P1$d$(j) (i.e., |P1$u$(i)–P1$d$(j)|) at the channel CH1 is determined in each of all possible combinations of the peak frequency components in the frequency-rising and -falling rages stored in the RAM 26c in step 800.

The routine then proceeds to step 820 wherein it is determined that each of the absolute values derived in step 810 is smaller than a given value or not. If a positive answer is obtained, then it is concluded that the powers P1$u$(i) and P1$d$(j) of a combination showing the absolute value smaller than the given value are determined as being equal to each other, and if the number of the peak frequency components of that combination is only one in each of the frequency-rising and -falling ranges, these peak frequency components are paired with each other. It is then determined whether pairs of all the peak frequency components in the frequency-rising and -falling ranges are derived or not. If a YES answer is obtained, then all the pairs are stored in the RAM 26c, and the routine terminates. Alternatively, if a NO answer is obtained, then the routine proceeds to step 830 wherein a given error processing is performed.

For example, the error processing may be achieved by ignoring the peak frequency components which are not paired in the previous steps or alternatively an alarm signal may be provided through an indicator installed in an instrument panel in front of a vehicle operator.

As appreciated from the above discussion, steps 710 to 740 perform the paring of the peak frequency components using the phase differences Δφu(i) and Δφd(j). The following steps 750 to 790 perform the pairing of the peak frequency components which are not yet paired using the power differences ΔPu(i) and ΔPd(j). Further, steps 800 to 820 also perform the pairing of the peak frequency components which are still not paired using the powers P1u(i) and P1d(j). Therefore, the paring of the peak frequency components using the phase differences and the power differences in this embodiment allows a plurality of targets present in different directions to be identified correctly. Additionally, even if there is targets present in the same direction, they are detected correctly.

The order of execution of the paring operations using the phase differences Δφu(i) and Δφd(j), the power differences ΔPu(i) and ΔPd(j), and the powers P1u(i) and P1d(j) may be changed. Only the pairing operation using the phase differences Δφu(i) and Δφd(j) or the power differences ΔPu(i) and ΔPd(j) may be performed. Alternatively, a paring operation using the absolute values ΔXu(i) and ΔXd(j) of the differences in complex vector may be performed in stead of the phase differences Δφu(i) and Δφd(j) and the power differences ΔPu(i) and ΔPd(j).

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An FM-CW radar system comprising:

radar wave transmitting means for transmitting a radar wave having a frequency increased at a given rate and decreased at a given rate;

radar wave receiving means for receiving a radar wave reflected from an object present in a radar detection range to mix the radar wave transmitted from said radar wave transmitting means with the radar wave received by said radar wave receiving means to produce a beat signal;

first means for taking the Fourier transform of the beat signal in a frequency-rising range wherein the frequency of the radar wave transmitted from said radar wave transmitting means is increased and a frequency-falling range wherein the frequency of the radar wave transmitted from said radar wave transmitting means is decreased to derive frequency components, said first means selecting peak frequency components showing peaks in a frequency spectrum of the derived frequency components in the frequency-rising range and the frequency-falling range, respectively;

second means for determining phases of the peak frequency components selected by said first means;

third means for comparing the phases of the peak frequency components in the frequency-rising range with the phases of the peak frequency components in the frequency-falling rage to pair at least one of the frequency components in the frequency-rising range with at least one of the frequency components in the frequency-falling range which show a preselected relation between the phases thereof as being derived based on the radar wave reflected from the same object; and fourth means for determining a distance to and a relative speed of the object based on frequencies of said peak frequency components paired by said third means.

2. An FM-CW radar system comprising:

radar wave transmitting means for transmitting a radar wave having a frequency increased at a given rate and decreased at a given rate;

first radar wave receiving means for receiving a radar wave reflected from an object present in a radar detection range to mix the radar wave transmitted from said radar wave transmitting means with the radar wave received by said first radar wave receiving means to produce a first beat signal;

second radar wave receiving means for receiving a radar wave reflected from an object present in the radar detection range to mix the radar wave transmitted from said radar wave transmitting means with the radar wave received by said second radar wave receiving means to produce a second beat signal;

first means for taking the Fourier transform of the first and second beat signals in a frequency-rising range wherein the frequency of the radar wave transmitted from said radar wave transmitting means is increased and a frequency-falling range wherein the frequency of the radar wave transmitted from said radar wave transmitting mesas is decreased to derive frequency components of the first and second beat signals, said first means selecting peak frequency components showing peaks in frequency spectra of the derived frequency components of the first and second beat signals in the frequency-rising range and the frequency-falling range, respectively;

second mesas for determining first complex vectors of the peak frequency components of the first beat signal derived by said first means;

third mesas for determining second complex vectors of the peak frequency components of the second beat signal derived by said first means;

fourth means for determining correlations between the first and second complex vectors of the peak frequency components determined by said second and third mesas in each of the frequency-rising range and the frequency-falling rage, showing substantially the same frequency;

fifth means for comparing the correlations between the first and second complex vectors of the peak frequency components in the frequency-rising range with the correlations between the complex vectors of the peak frequency components in the frequency-falling range to determine at least one pair of the peak frequency components showing substantially the same correlation;

sixth means for determining a distance to and relative speed of the object based on a frequency of the pair of the peak frequency components determined by said fifth means.

3. An FM-CW radar system as set forth in claim 2, wherein said second means determines first phases of the peak frequency components of the first beat signal based on the first complex vectors, said third means determining second phases of the peak frequency components of the second beat signal based on the second complex vectors, and said fourth means determines differences between the first and second phases, respectively, as the correlations.

4. An FM-CW radar system as set forth in claim 2, wherein said second means determines first amplitudes of the peak frequency components of the first beat signal based on the first complex vectors, said third means determining second amplitudes of the peak frequency components of the second beat signal based on the second complex vectors, and fourth means determines the correlations between the first and second amplitudes, respectively.

5. An FM-CW radar system as set forth in claim 4, wherein the correlations between the first and second amplitudes are differences between the first and second amplitudes.

6. An FM-CW radar system as set forth in claim 2, wherein said fourth means determines first differences between the first complex vectors of the peak frequency components and the second complex vectors of the peak frequency components in the frequency-rising range and second differences between the first complex vectors of the peak frequency components and the second complex vectors of the peak frequency components in the frequency-falling range, and wherein said fifth means compares the first differences with the second differences to determine at least one pair of the peak frequency components showing the first difference and the second difference equal to each other.

7. An FM-CW radar system as set forth in claim 6, wherein said fifth means compares absolute values of the first differences with absolute values of the second differences to determine the at least one pair of the peak frequency components showing the absolute value of the first difference and the absolute value of the second difference equal to each other.

8. An FM-CW radar system as set forth in claim 6, wherein the first differences are differences in bearing angle of the first complex vectors and the second complex vectors of the peak frequency components in the frequency-rising range and the second differences are differences in bearing angle of the first complex vectors and the second complex vectors of the peak frequency components in the frequency-falling range.

* * * * *